R. G. SPINK.
AIR COMPRESSING AND SHOCK ABSORBING SYSTEM FOR VEHICLES.
APPLICATION FILED JULY 12, 1916.
1,247,465.
Patented Nov. 20, 1917.
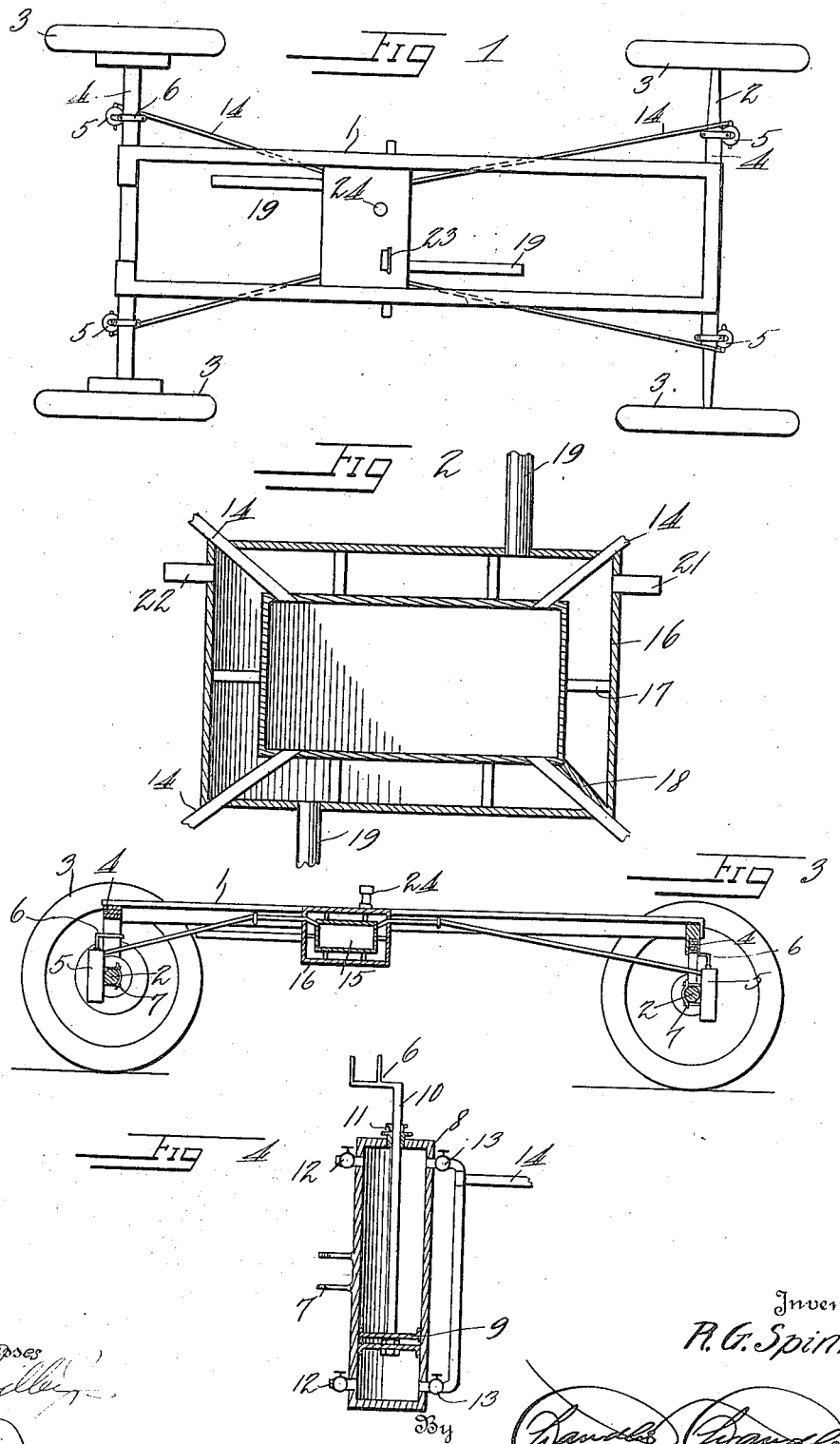

UNITED STATES PATENT OFFICE.

RICHARD G. SPINK, OF GIBBON, NEBRASKA.

AIR-COMPRESSING AND SHOCK-ABSORBING SYSTEM FOR VEHICLES.

1,247,465.     Specification of Letters Patent.     Patented Nov. 20, 1917.

Application filed July 12, 1916. Serial No. 108,957.

*To all whom it may concern:*

Be it known that I, RICHARD G. SPINK, a citizen of the United States, residing at Gibbon, in the county of Buffalo, State of Nebraska, have invented certain new and useful Improvements in Air-Compressing and Shock-Absorbing Systems for Vehicles; and I do hereby declare the following to be a full, clear, and exact description of the invention, such as will enable others skilled in the art to which it appertains to make and use the same.

This invention relates to an air compressing and shock absorbing system for a vehicle.

An object of the invention resides in the provision of a system of this character wherein the shock absorber operates to compress air within a storage tank, which air will act to control the absorbers and may be used for the various purposes incidental to the operation of an automobile.

A further object of the invention resides in so constructing the system that the air within the storage tank may be heated to various degrees.

With these and other objects in view, such as will appear as my description progresses, my invention comprises the combination and arrangement of parts as set forth in and falling within the scope of the appended claims.

In the drawing:

Figure 1 is a plan view of my invention showing the same applied to the chassis of an automobile;

Fig. 2 is a horizontal sectional view through the air storage tank and muffler;

Fig. 3 is a vertical sectional view taken longitudinally of the automobile, and

Fig. 4 is a vertical sectional view of one of the absorbers.

In the drawing I have illustrated a chassis of an automobile which includes a frame 1, axles 2, wheels 3 and springs 4 which are interposed between the axles and frame. A pair of pneumatic shock absorbers 5 is interposed between the spring 4 and the axle 2 at each end of the chassis being clamped to the spring by clamps 6 and to the axle by clamps 7. Each of these shock absorbers includes a cylinder 8 on which the clamp 7 is formed and a piston 9 from which a rod 10 extends, on which rod the clamp 6 is formed. The piston rod 10 is packed by a suitable gland 11 and the piston 9 consists of a pair of flanged leather washers, which are held in place upon the rod by suitable nuts. Extending from the upper and lower ends of each of these cylinders 8 is an air inlet valve 12 which may be opened and closed to any degree desired to permit the passage of air into the cylinder at various degrees of rapidity. Extending from the opposite side of each cylinder at each end thereof is a valve 13, which valves are connected to a pipe 14 which extends to and communicates with an air storage tank 15, which tank is located within a muffler 16, being secured in place by stay bolts 17. A partition 18 divides the space between the tank and the wall of the muffler. The exhaust pipe 19 of the engine extends into the muffler at one end of the same and from the muffler at the other end of the same. Extending from the end of the muffler opposite to the point where the exhaust pipe extends into the muffler is a partial cut-out pipe 21 while at the end adjacent to the last mentioned exhaust pipe is a general cut-out pipe 22. The air tank 15 is provided with a pressure gage 23 so that the pressure within the tank may be readily determined and it is also provided with a release valve 24 which may be set so as to release the air from the tank when the air reaches any predetermined pressure for a purpose which will later appear. By heating the air in the storage tank the same may be utilized for supplying a hot air mixture to the carbureter or radiator, as desired by a pipe or other connection (not shown), thus aiding the operation of the machine in cold weather.

When the axles 2 of the vehicle move relatively to the springs 4 the pistons 9 in the cylinders 8 will be operated and, inasmuch as air is drawn into the cylinders through the valves 12 the air will be forced by way of the valves 13 and pipes 14 into the storage tank 15 so that the air will be compressed in this tank. After air has reached a predetermined pressure within this tank it will resist the pumping of air into the tank inasmuch as the force will be applied to the valves 13 to maintain the same closed. Therefore upon the pressure within the tank 15 depends the ease with which the pistons 9 operate within the cylinders.

Now the valve 24 may be adjusted so that the maximum pressure within the tank may be varied and by this means the shock absorbers may be controlled to operate when various forces are applied thereto.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In an apparatus of the class described, the combination of pneumatic shock absorbers including operatively connected cylinders and pistons, an air storage tank, pipes leading from said cylinders to said tank, valves in said pipes opening toward said tank, an adjustable release valve on said tank, a muffler inclosing said tank, and an engine exhaust pipe connected to said muffler, whereby the air in said tank may be heated.

2. In an apparatus of the class described, the combination of pneumatic shock absorbers including operatively connected cylinders and pistons, an air storage tank, pipes connecting said cylinders and said tank, a muffler inclosing said tank, and an engine exhaust pipe connected to said muffler whereby the air in said tank may be heated.

In testimony whereof, I affix my signature, in the presence of two witnesses.

RICHARD G. SPINK.

Witnesses:
 JOSEPH E. OWEN,
 JOSEPH W. ROSS.